(12) United States Patent
Sprainis et al.

(10) Patent No.: US 8,783,670 B2
(45) Date of Patent: *Jul. 22, 2014

(54) COMPRESSIBLE ELASTOMERIC SPRING

(75) Inventors: Ronald J. Sprainis, Springfield, OR (US); Michael E. Ring, Saint John, IN (US); Bradley Anderson, Des Plaines, IL (US); Jonathon Marlow, Hobart, IN (US)

(73) Assignee: WABTEC Holding Corp, Wilmerding, PA (US)

( * ) Notice: Subject to any disclaimer, the term of this patent is extended or adjusted under 35 U.S.C. 154(b) by 931 days.

This patent is subject to a terminal disclaimer.

(21) Appl. No.: 12/150,809

(22) Filed: May 1, 2008

(65) Prior Publication Data

US 2008/0284077 A1     Nov. 20, 2008

Related U.S. Application Data

(60) Provisional application No. 60/926,987, filed on May 1, 2007.

(51) Int. Cl.
| | | |
|---|---|---|
| *B60G 11/22* | (2006.01) | |
| *B61G 9/06* | (2006.01) | |
| *B61G 9/22* | (2006.01) | |
| *B61G 9/10* | (2006.01) | |
| *B21F 35/00* | (2006.01) | |
| *B29L 31/00* | (2006.01) | |
| *B29C 43/36* | (2006.01) | |

(52) U.S. Cl.
CPC ........... *B21F 35/00* (2013.01); *B29L 2031/721* (2013.01); *B29C 2043/3665* (2013.01); *B61G 9/06* (2013.01); *B61G 9/22* (2013.01); *B29C 2043/3613* (2013.01); *B61G 9/10* (2013.01)
USPC ......... 267/294; 267/292; 267/141; 267/141.1

(58) Field of Classification Search
USPC ............. 267/3, 257, 258, 292, 293, 294, 141, 267/141.1, 153; 213/22, 29, 30, 32 A, 40 R, 213/44, 45, 40 D, 46 A, 53
See application file for complete search history.

(56) References Cited

U.S. PATENT DOCUMENTS 2,713,485 A * 7/1955 Tillou .................. 267/141.1
2,810,485 A * 10/1957 Housman ................ 213/221

(Continued)

FOREIGN PATENT DOCUMENTS

DE    1993283    9/1968
SU    1039773    7/1983

OTHER PUBLICATIONS

Machine translation of DE 1993283 obtained from espacenet.org.*

(Continued)

*Primary Examiner* — Bradley King
*Assistant Examiner* — Nicholas J Lane
(74) *Attorney, Agent, or Firm* — James Ray & Assoc

(57) ABSTRACT

A compressible spring for at least absorbing and dissipating energy includes a plurality of elastomeric pads disposed coaxially and in series with each other and a plurality of separator plates, with each plate being disposed between a pair of the adjacent pads. A plurality of first prongs are formed integrally with or secured to a first surface of each separator plate for attaching the plate to one pad and a plurality of second prongs are formed integrally with or secured to a second surface for attaching the plate to an opposed pad. An axial aperture is also formed through each plate with prongs positioned in an alternating manner on a peripheral edge of the axial aperture. Projections may be also provided on each surface of the plate and adapted with an axial aperture that continues through the plate for additional attachment of the plate to the pair of pads.

20 Claims, 6 Drawing Sheets

(56) References Cited

U.S. PATENT DOCUMENTS

| | | | |
|---|---|---|---|
| 3,279,048 A | | 10/1966 | Grove et al. |
| 3,637,088 A | * | 1/1972 | Bremond ......................... 213/45 |
| 4,198,037 A | | 4/1980 | Anderson |
| 4,997,171 A | * | 3/1991 | Toms, Jr. ........................ 267/294 |
| 5,335,403 A | | 8/1994 | Jensen |
| 5,351,844 A | | 10/1994 | Carlstedt |
| 6,792,871 B2 | | 9/2004 | O'Donnell et al. |
| 7,258,243 B2 | | 8/2007 | Ring et al. |
| 7,338,034 B2 | | 3/2008 | Aspengren et al. |
| 8,096,432 B2 | * | 1/2012 | Sprainis et al. .............. 213/32 R |
| 8,136,683 B2 | * | 3/2012 | Sprainis et al. .............. 213/40 R |
| 8,336,209 B2 | * | 12/2012 | Sprainis et al. ............ 29/896.93 |
| 2013/0097866 A1 | * | 4/2013 | Sprainis et al. ............ 29/896.93 |

OTHER PUBLICATIONS

Machine Translation of DE 1 993 283.*

* cited by examiner

COMPRESSIBLE ELASTOMERIC SPRING

CROSS-REFERENCE TO RELATED APPLICATIONS

This application is related to and claims priority from Provisional Patent Application Ser. No. 60/926,987 filed on May 1, 2007. This application is further closely related to co-pending U.S. Ser. No. 12/150,777 entitled "combination Yoke and Elastomeric Draft Gear", to U.S. Ser. No. 12/150,926 entitled "Plate like member For A Compressible Elastomeric Spring" now U.S. Pat. No. 7,857,273, to co-pending U.S. Ser. No. 12/150,928 entitled "Elastomeric Pad For A Compressible Elastomeric Spring", to co-pending U.S. Ser. No. 12/150,929 entitled "Method of Making Compressible Elastomeric Spring", to U.S. Ser. No. 12/150,925 entitled "Method Of Making Elastomeric Pad For A Compressible Elastomeric Spring" now U.S. Pat. No. 7,981,348, to co-pending U.S. Ser. No. 12/150,777 entitled "Combination Yoke and Elastomeric Draft Gear", to co-pending U.S. Ser. No. 12/150,808 entitled "Combination Yoke and Elastomeric Draft Gear Having A Friction Mechanism", and to co-pending U.S. Ser. No. 12/150,927 entitled "Elastomeric Draft Gear Having A Housing", filed concurrently herewith. These applications are being assigned to the assignee of the present invention and the disclosures of these co-pending applications are hereby incorporated by reference thereto.

FIELD OF THE INVENTION

The present invention relates, in general, to compressible elastomeric springs for absorbing and dissipating energy and, more particularly, this invention relates to elastomeric compressible springs for at least absorbing and dissipating energy during operation of a passenger or freight railcar and, yet more particularly, the instant invention relates to an elastomeric compressible spring having a novel arrangement for centering and attaching elastomeric pads and plate like members axially disposed in series with each other.

BACKGROUND OF THE INVENTION

As is generally well known, compressible elastomeric springs are employed in a variety of applications for at least absorbing and dissipating energy from a dynamic impact load applied to the compressible spring. The applied dynamic impact load is due to shock and/or vibration resulting from a specific use of the spring.

Lately, compressible elastomeric springs have been gaining wide acceptance in passenger and freight railcar applications. Specifically, compressible elastomeric springs have been designed for use as an integral part of the side bearing assembly for restricting "hunting" or "rolling" movements of the railcar about a longitudinal centerline. U.S. Pat. No. 7,338,034 issued to Aspengren et al. and U.S. Pat. No. 6,792,871 issued to O'Donnell et al. disclose alternative types of such springs usable in the side bearing assembly.

Of a further importance, compressible elastomeric springs have been frequently employed in railcar buffer assemblies, draft gear assemblies, and drawbar assemblies for cushioning impact energy between two adjoining railcars during make up and operation of a train consist.

For use in applications for at least absorbing and cushioning energy from dynamic impact loads present between a pair of two adjoining railcars, compressible elastomeric springs generally utilize a series of elastomeric pads and metal plate like members arranged in interposed stacked relationship with each other. However, prior to the conception and design of the present invention, the compressible elastomeric springs required guidance during compression and extension movements to provide for lateral stability and satisfactory performance. Generally, such guidance is provided by a metal rod inserted through the central apertures in each pad and plate like member, enclosing the spring into a housing and positioning the edges of the metal plate like members in abutting relationship with the interior wall surfaces of the housing or using a combination of the housing and center rod. However, the use of the housing and/or metal rod increases the manufacturing cost of the initial assembly as well as the maintenance costs during its useful life in railcar operation. Use of housing and/or metal rod also increases weight of the impact energy absorbing assembly. Since there is a continuing desire to increase loading capacity of each railcar, the weight associated with the housing and/or rod adversely affects such loading capacity.

Furthermore, such continuing desire for increased loading capacity adds to dynamic impact loads experienced by the energy absorbing assemblies during operation and makeup of the train consist. Consequently, such higher dynamic impact loads are directly transferred to the compressible elastomeric spring. Moreover, it has been known to exceed mandated maximum speeds during makeup of the train consist which further increases the dynamic impact loads to be absorbed and cushioned by various buffer devices. However, the compressible elastomeric springs presently in use have not been reliable in absorbing all applicable dynamic impact loads. Therefore, there is a continuing need for an inexpensive and reliable compressible elastomeric spring capable of absorbing impact energy loads without the use of the metal rod or the housing for guiding purposes.

SUMMARY OF THE INVENTION

In accordance with one aspect of the present invention, there is provided a compressible spring for at least absorbing and dissipating energy from a dynamic impact load applied to the compressible spring. The compressible spring includes a compressible elastomeric pad defining a central axis and having a pair of axial ends. The pad is manufactured from a predetermined material and has a predetermined shape factor enabling repetitive absorption and dissipation of dynamic impact loads in excess of about one hundred thirty percent (130%) of ultimate tensile strength of the predetermined material. A pair of end members are also provided. Each of the pair of end members has a surface thereof abuttingly engaging one of the pair of axial ends. Additionally, there is an attachment means for attaching the each of the pair of end members to the pad.

In accordance with another aspect of the present invention, there is provided a compressible spring for at least absorbing and dissipating energy from a dynamic impact load applied to the compressible spring. The compressible spring includes a compressible elastomeric pad defining a central axis and having a pair of axial ends. A pair of end members are also provided. Each of the pair of end members has a surface thereof abuttingly engaging one of the pair of axial ends. There is also a predetermined plurality of prongs being at least one of formed integrally with the end member and secured to the surface thereof. Each of the predetermined plurality of first prongs has a trapezoidal shape and extends outwardly at a predetermined angle relative to the first surface into the pad for attaching each end member to a respective axial end of the pad.

According to yet another aspect of the present invention, there is provided a compressible spring for at least absorbing and dissipating energy from a dynamic impact load applied to the compressible spring along a central axis thereof. The compressible spring includes a predetermined plurality of elastomeric pads disposed coaxially and in series with each other. Each pad has a peripheral side surface and a pair of axial ends. Each of the pair of axial ends has a surface thereof disposed normal to the central axis. There is also a predetermined plurality of separator plate like members. Each of the predetermined plurality of separator plate like members is disposed between a pair of the pads. Each separator plate like member has a first flat surface thereof abuttingly engaging an axial end of one pad. An opposed second surface thereof abuttingly engages an axial end of an adjacent pad. The pads and separator plate like members form in combination a multi-tiered stack having a predetermined initial height. Each pad compresses and extends along the central axis causing movement of the separator plate like members along the central axis when the dynamic impact load is applied to and removed from the spring. A predetermined plurality of first prongs is provided being at least one of formed integrally with the plate like member and secured to the first surface thereof. Each of the predetermined plurality of first prongs has a trapezoidal shape and extends outwardly at a predetermined angle relative to the first surface for attaching each separator plate like member to one of the pair of pads. A predetermined plurality of second prongs is provided being at least one of formed integrally with the plate like member and secured to the second surface thereof. Each of the predetermined plurality of second prongs has a trapezoidal shape and extends outwardly at a predetermined angle relative to the second surface for attaching each separator plate like member to an opposed one of the pair of pads.

According to a further aspect of the present invention, there is provided a compressible spring for at least absorbing and dissipating energy from a dynamic impact load applied to the compressible spring along a central axis thereof. The compressible spring includes a predetermined plurality of elastomeric pads disposed coaxially and in series with each other. Each pad has a peripheral side surface and a pair of axial ends. Each of the pair of axial ends has a surface thereof disposed normal to the central axis. There is a predetermined plurality of separator plate like members. Each of the predetermined plurality of separator plate like members is disposed between a pair of the pads. Each separator plate like member has a first substantially flat surface thereof abuttingly engaging an axial end of one pad and an opposed second substantially flat surface thereof abuttingly engaging an axial end of an adjacent pad. The pads and separator plate like members form in combination a multi-tiered stack having a predetermined initial height. Each pad compresses and extends along the central axis causing movement of the separator plate like members along the central axis when the dynamic impact load is applied to and removed from the spring. An axial aperture is formed through each of the predetermined plurality of separator plate like members concentric with the central axis of the stack. Finally, there is means which is secured to each of the predetermined plurality of separator plate like members and positioned on a peripheral edge of the axial aperture for attaching each separator plate like member to each of the pair of the pads.

In accordance with another aspect of the present invention, there is provided a compressible spring for at least absorbing and dissipating energy from a dynamic impact load applied to the compressible spring along a central axis thereof. The compressible spring includes a predetermined plurality of elastomeric pads disposed coaxially and in series with each other. Each pad has a peripheral side surface and a pair of axial ends. Each of the pair of axial ends has a surface thereof disposed normal to the central axis. Each pad is also manufactured from a predetermined material and has a predetermined shape factor enabling repetitive absorption and dissipation of dynamic impact loads in excess of about one hundred thirty percent (130%) of ultimate tensile strength of the material. There is also provided a predetermined plurality of separator plate like members. Each of the predetermined plurality of separator plate like members is disposed between a pair of the pads. Each separator plate like member has a first substantially flat surface thereof abuttingly engaging an axial end of one pad and an opposed second substantially flat surface thereof abuttingly engaging an axial end of an adjacent pad. The pads and separator plate like members form in combination a multi-tiered stack having a predetermined initial height. Each pad compresses and extends along the central axis causing movement of the separator plate like members along the central axis when the dynamic impact load is applied to and removed from the spring. There is means which is provided for attaching each of the plurality of separator plate like members to the pair of pads.

OBJECTS OF THE INVENTION

It is, therefore, one of the primary objects of the present invention to provide a compressible elastomeric spring for at least absorbing and dissipating energy from dynamic impact loads.

Another object of the present invention is to provide a compressible elastomeric spring that includes a pair of plate like members each attached to a respective end of an elastomeric pad.

Yet another object of the present invention is to provide a compressible elastomeric spring that includes a series of elastomeric pads and plate like members arranged in interposed stacked relationship with each other and that does not require guidance by way of a center rod or housing during operation.

A further object of the present invention is to provide a compressible elastomeric spring that includes a series of elastomeric pads and plate like members arranged in interposed stacked relationship with each other and that employs prongs in each plate like member for piercing an adjacent end surface of the pad and extending thereinto.

Yet a further object of the present invention is to provide a compressible elastomeric spring that includes a series of elastomeric pads and plate like members arranged in interposed stacked relationship with each other and that employs prongs positioned on a peripheral edge of an axial aperture formed through each plate like member for piercing an adjacent end surface of the pad and extending thereinto.

An additional object of the present invention is to provide a compressible elastomeric spring that includes a series of interposed elastomeric pads and plate like members that is economical to manufacture.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
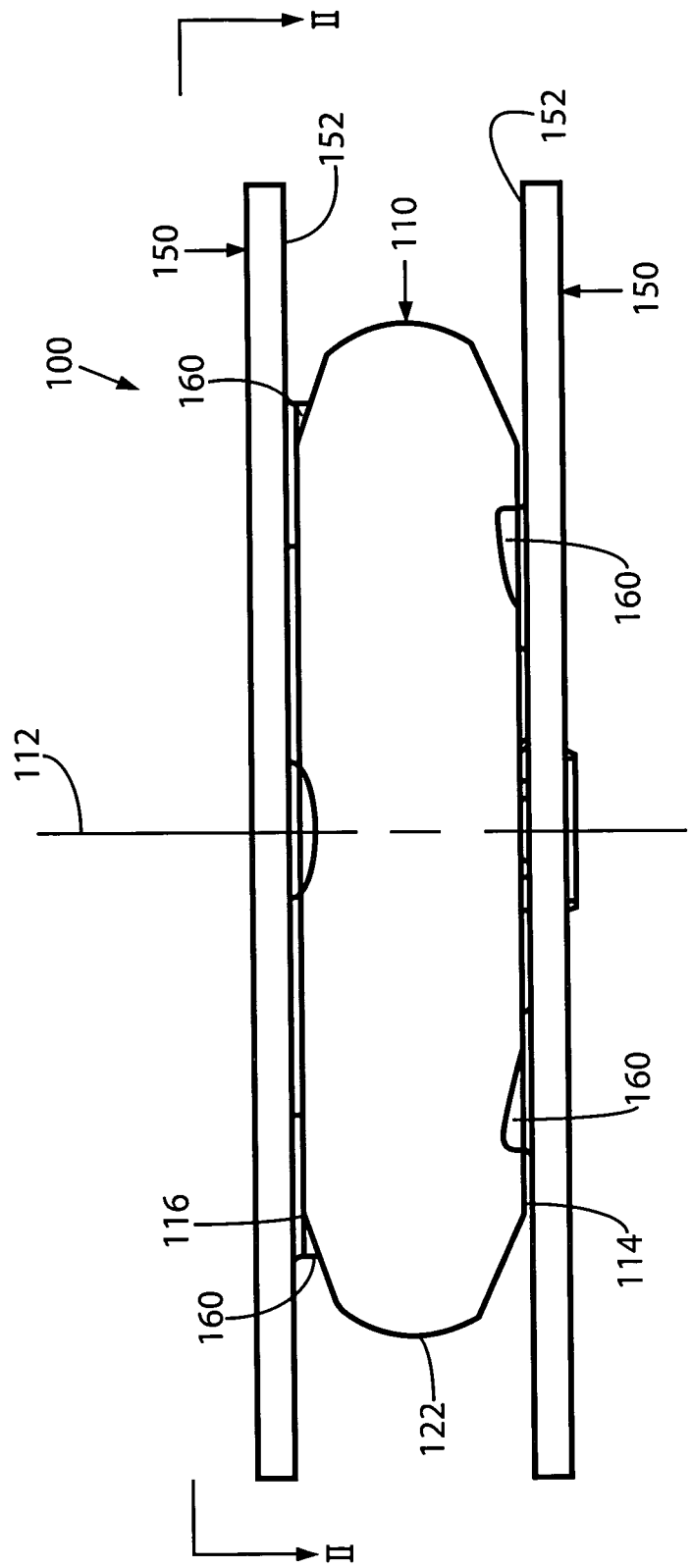
FIG. 1 is a side elevation view of a compressible elastomeric spring constructed in accordance with one embodiment of the present invention.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a railway vehicle applies but is not limited to passenger railcar, freight railcar, locomotive and the like railway vehicles.

The best mode for carrying out the invention is presented in terms of two embodiments, herein depicted within FIGS. 1 through 5. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

Figure 2:
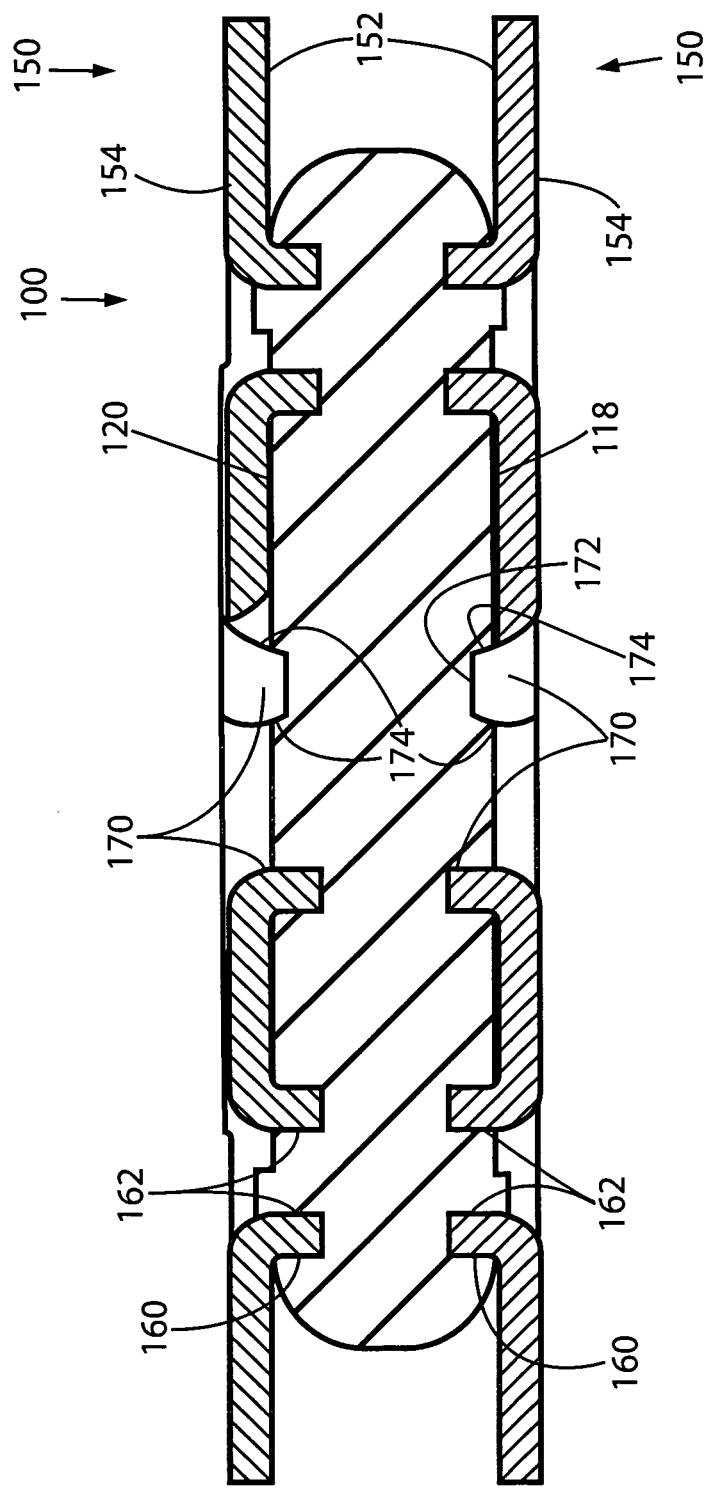
FIG. 2 is a cross-sectional elevation view of the compressible spring along lines II-II of FIG. 1.

Reference is now made, to FIGS. 1-2, wherein there is shown a compressible elastomeric spring, generally designated as 100, for at least absorbing and dissipating energy from a dynamic impact load applied thereto and constructed in accordance with one embodiment of the invention. The compressible elastomeric spring 100 includes a compressible elastomeric pad, generally designated as 110 and a pair of end members, each attached in abutting engagement to a respective axial end of the pad 110. In use, the end members are employed for attaching the spring 100 to respective masses. Thus, the shape, material and size of each end member will be selected to fit specific application. The present invention is illustrated and described in combination with a pair of plate like members employable in a draft gear assembly employable in a passenger or freight railcar and capable of cushioning dynamic impact loads during makeup and operation of a train consist, although it will be apparent to those skilled in the relevant art that the present invention may be applied to other applications and as such should not be interpreted as a limiting factor of the spring 100 and end members of the present invention. Thus, the end members are illustrated and described as plate like members, generally designated as 150. The compressible elastomeric pad 110 is disclosed in a copending U.S. Ser. No. 12/150,928 entitled "Elastomeric Pad For A Compressible Elastomeric Spring" while the plate like member 150 is disclosed in a co-pending U.S. Ser. No. 12/150,926 entitled "Plate like member For A Compressible Elastomeric Spring", both filed concurrently herewith.

Briefly and for the sake of reader's convenience, the pad 110 defines a central axis 112 and has a pair of axially opposed ends 114 and 116. The pad also has a peripheral side surface 122. In further accordance with this embodiment, the pad 110 is manufactured from a thermoplastic elastomer material and has a predetermined shape factor enabling repetitive absorption and dissipation of dynamic impact loads in excess of one hundred thirty percent (130%) of ultimate tensile strength of such copolyester polymer material. The presently preferred thermoplastic elastomer material is a copolyester polymer material manufactured by E.I. DuPont de Nemours & Co. of Wilmington, Del. under the general HYTREL trademark and specifically, under the Hytrell 5556 brand. Such Hytrell material is characterized by ultimate tensile strength of about 5,800 pounds per square inch.

Also briefly, each plate like member 150, which is disclosed in details in the co-pending U.S. Ser. No. 12/150,926 entitled "Plate like member For A Compressible Elastomeric Spring", has a surface 152 thereof abuttingly engaging one of the pair of axially opposed ends 114, 116. Also provided is an attachment means for attaching each plate like member 150 to the pad 110. As is conventionally known, such attachment means includes a predetermined plurality of projections 160 at least one of formed integrally with the plate like member 150 and secured to the surface 152 of the plate like member 150 and extending outwardly therefrom. Each projection 160 has a body 162 with a round cross-section and an aperture 164 formed therethrough and further formed through the thickness of the plate like member 150. Such annular ring like shape of the projection 160 is advantageously formed in the plate like member 150 manufactured from a presently preferred metallic material by a stamping method. The outer diameter of the body 162 and the diameter of the aperture 164 are determined based on the material and design of the pad 110 to allow flow of such material into the aperture 164 and around the body 162 during cold forming process of such spring 100. Thus, after forming the spring 100, the projections 160 extend into the thickness of the pad 110 and provide mechanical interlocking of the plate like member 150 with the pad 110 in a bonding and adhesive free manner.

The projections 160 are positioned at equal angles from each other at a constant radius from the central axis 112 of such pad 110 and their quantity is selected to provide for lateral uniformity of the spring 100 during operation, wherein the central axis 112 also defines the central axis of the spring 100.

The spring 100 further includes means for maintaining axial straightness and lateral stability or stiffness of the spring 100 during operation. Such lateral stability maintaining means includes a predetermined plurality of prongs 170 at least one of formed integrally with the plate like member 150 and secured to the surface 152 of the plate like member 150. Each prong 170 has a predetermined shape and extends outwardly at a predetermined angle relative to the surface 152.

During assembly and forming of the spring 100 when the axial forming load is axially applied to an opposed surface 154 of the plate like member 150, the end 172 of each prong 170 is adapted to pierce the surface 118, 120 of the axial end 114, 116 respectively with the body of the prong 170 then penetrating and extending into the pad 110.

In operation to at least absorb and dissipate energy from a dynamic impact load applied to one of the plate like members 150, the pad 110 is axially compressed with the peripheral side surface 122 expanding radially between the plate like members 150. As it is well known in the art, the pad 110 is capable of absorbing and dissipating energy during compression until the pad 110 reaches its maximum operating compressible height. The pad 110 extends to its initial height when the dynamic impact load is removed. One of the plate like members 150 axially moves with the pad 110.

The end 172 may be a sharp point providing for a triangular shape of the prong 170, however, it is presently preferred to adapt the end 172 with a predetermined width and taper the side edges 174 providing for a trapezoidal shape of the prong 170. As it will be explained later in this document, such trapezoidal shape is advantageous in increasing the surface contact between the prong 170 and the pad 110 during forming thereof. The trapezoidal shape is further advantageous for economically manufacturing the plate like member 150 from a presently preferred metallic material by the stamping method. Equally as well, the trapezoidal shape has been found sufficient in piercing the surface 118, 120 of the axial end 114, 116 respectively.

The angle of the prong 170 relative to the surface 152 is determined to enable sufficient extension of the prong 170 into the pad 110 and respective flow of the material of the pad 110 around the prong 170 during the cold forming process. It is presently preferred to position the prong 170 generally perpendicular relative to the surface 152 of the plate like member 150.

The prongs 170 are positioned at equal angles from each other relative to the central axis 112 of the pad 110. Furthermore, the prongs 170 are positioned in proximity to the central axis 112 and at a constant distance therefrom to improve concentricity of the spring 100. The quantity of the prongs 172 is also selected to provide for lateral uniformity of the spring 100 during operation.

The lateral stability maintaining means further includes an axial aperture 180 formed through the plate like member 150 concentric with the central axis 112, whereby the prongs 170 are positioned on or in close proximity to a peripheral edge 182 of such axial aperture 180 and having an inner surface 176 disposed tangential to the peripheral edge 182. Additionally, the pad 110 is provided with a pair of axial projections 130 each being at least one of integrally formed with and secured to a respective end 114, 116 of the pad 110. During assembly and forming of the spring 100, the projection 130 axially extends into the axial aperture 180 between the inner surfaces 176 of the prongs 170. The peripheral annular side surface 134 of the projection 130 may be sized for a sliding fit with the inner surfaces 176 of the prongs 170 but, preferably, such peripheral side surface 134 is sized for frictional engagement with such inner surfaces 176. Such frictional engagement is a predetermined interference fit between the size of the side surface 134 of the projection 130 being greater than the radial distance between the inner surfaces 176 of prongs 170. The present invention also contemplates that when the end member has a shape different from the plate like member 150, the axial aperture 180 may be formed as a simple axial cavity (not shown).

The lateral stability maintaining means additionally includes a pair of grooves 140 each formed in a respective surface 118, 120 about the peripheral side surface 134 of each projection 130 and wherein the prongs 170 are aligned with a respective groove 140.

The prongs 170 in one plate like member 150 may be aligned with the prongs 170 in an opposed plate like member 150, however, it is presently preferred to interpose in an alternating manner the prongs 170 in one plate like member 150 with the prongs 170 of an opposed one plate like member 150. Thus, the interposed prongs 170 form a generally annular ring like arrangement extending into the pad 110. The interposed relationship also enables to increase the operative height of the prongs 170.

To assure that the prongs 170 are interposed, the spring 100 includes means for aligning the plate like members 150. Preferably, such alignment means includes an alignment aperture 188 formed through each plate like member 150 so that the pair of alignment apertures 188 are aligned coaxially with the central axis 112 during assembly of the spring 110. It is further preferred to position such alignment aperture 188 in proximity to an edge of the plate like member 150 for ease of visual alignment identification during assembly and forming of the spring 100.

The spring 100 constructed in accordance with the above described embodiments may be simply retrofitted into the existing draft gears, for example of a common type disclosed in U.S. Pat. No. 5,351,844 to Carlstedt, whose teachings are incorporated into this document by reference thereto.

The present invention also contemplates that in applications wherein the peripheral guidance of the spring 100 is allowed or available, the prongs 170 will be sufficient to attach the plate like members 150 to the pad 110 without the need for projections 160. Equally as well, the projections 160 may be employed without the prongs 170.

Figure 3:
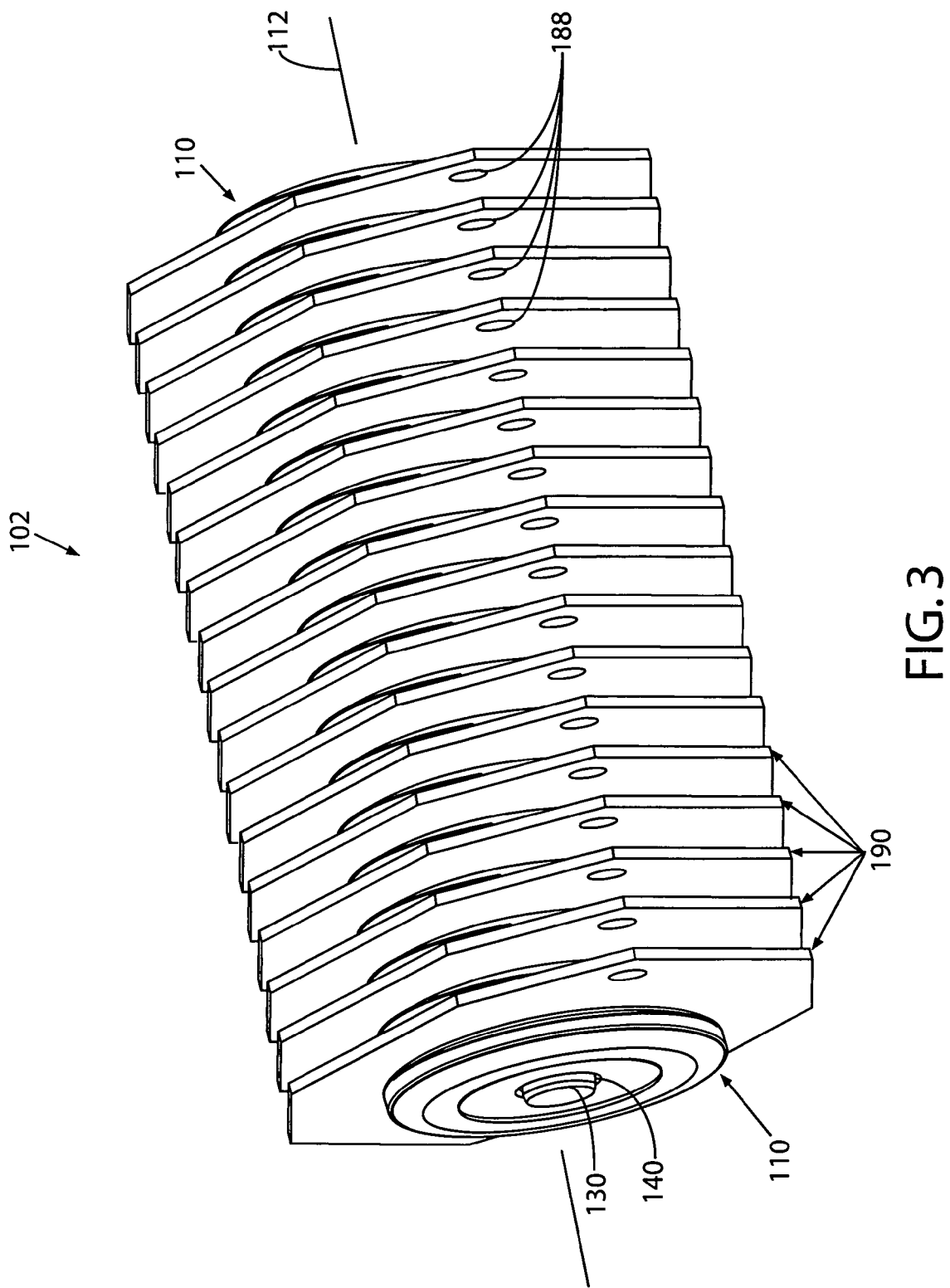
FIG. 3 is an isometric view of a compressible elastomeric spring constructed in accordance with another embodiment of the present invention.
Figure 4:
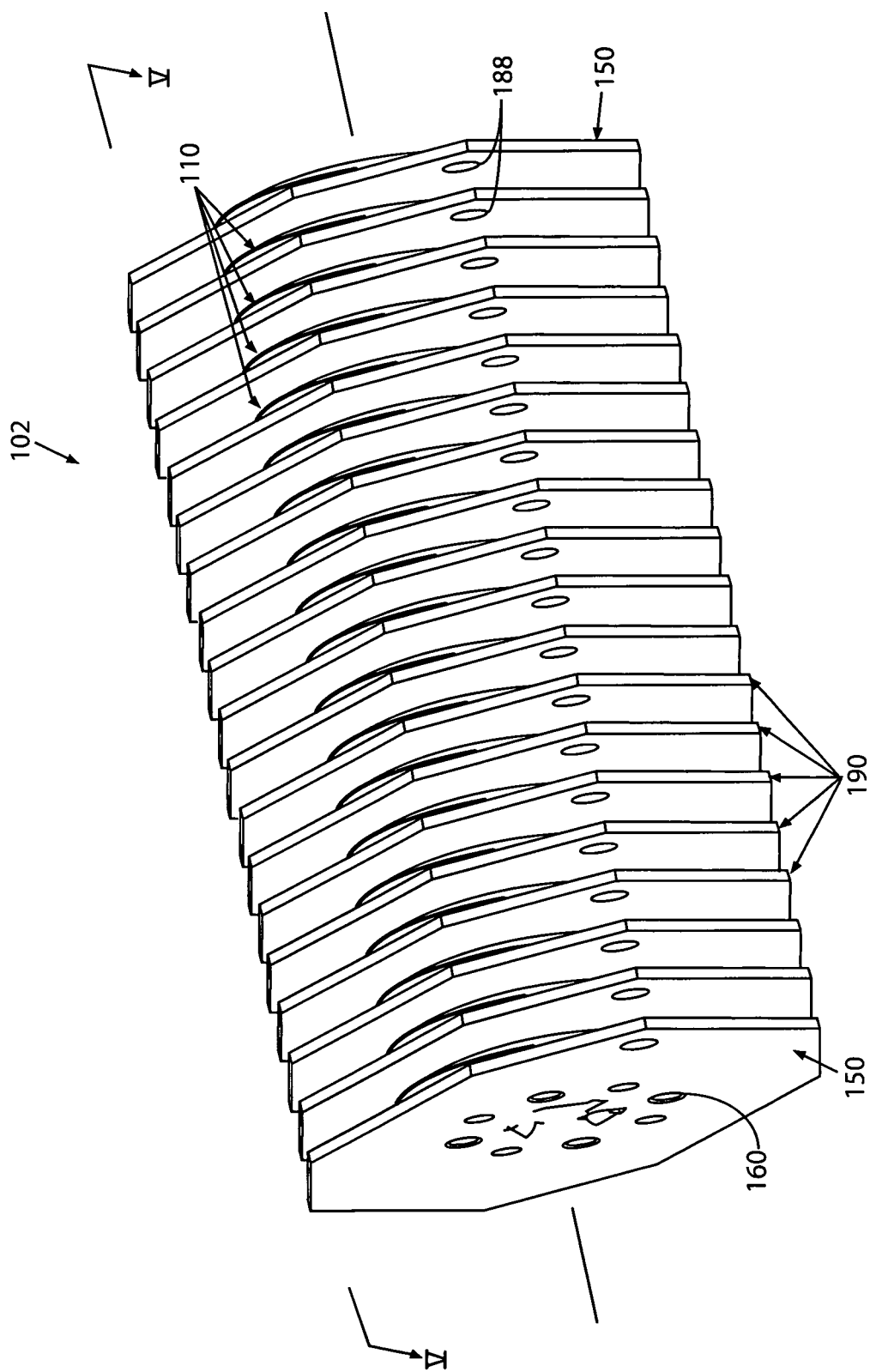
FIG. 4 is an isometric view of a compressible elastomeric spring of FIG. 3, particularly illustrating use of end spring members.
Figure 5:
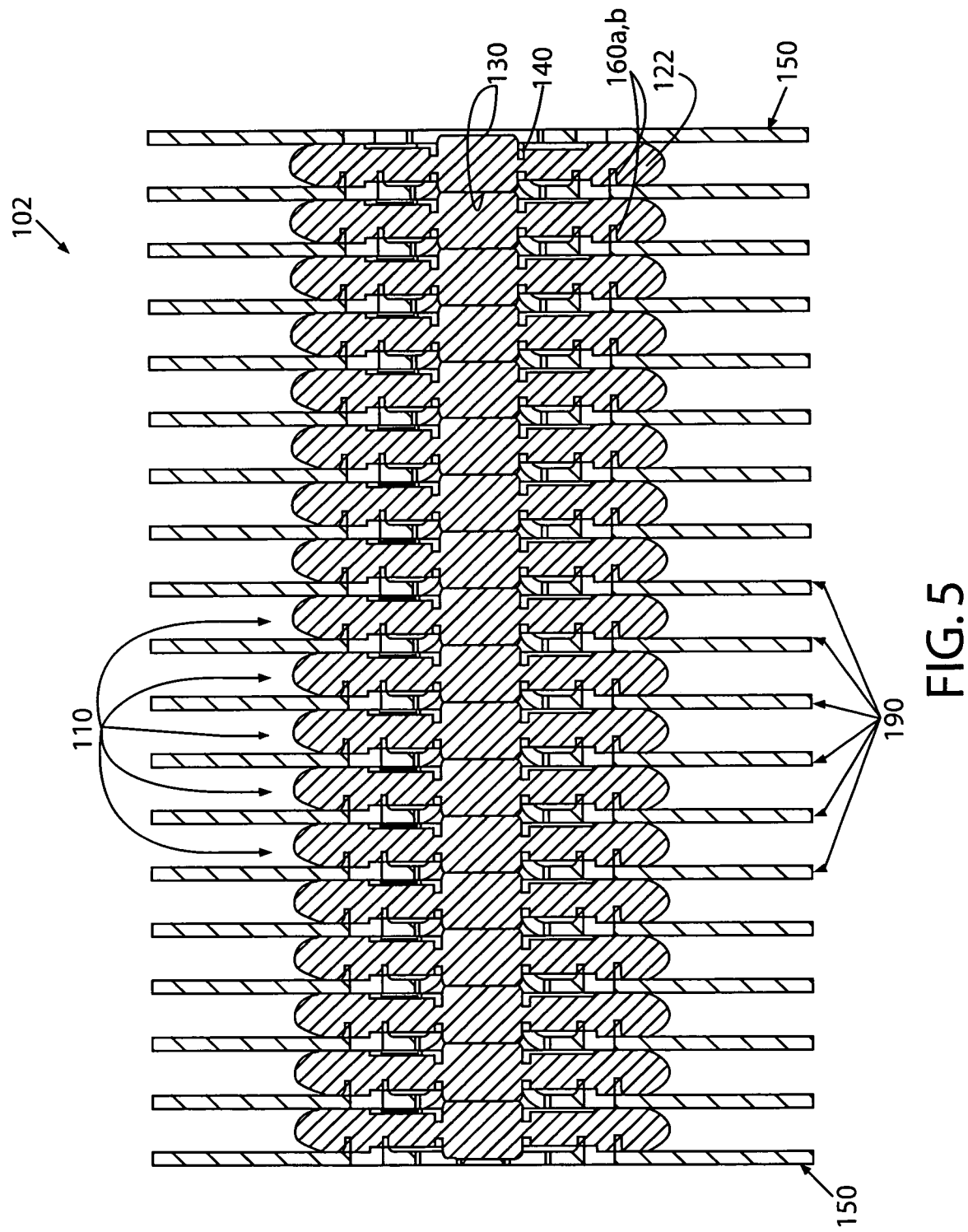
FIG. 5 is a cross-sectional elevation view of the compressible spring along lines V-V of FIG. 4.

In accordance with another embodiment of the present invention, best shown in FIGS. 3-5, there is provided a spring, generally designated as 102. The spring 102 includes a plurality of pads 110 disposed coaxially and in series with each other. The spring 102 also includes a plurality of separator plate like members, generally designated as 190, each disposed between a pair of the pads 110. Each separator plate like member 190, is also disclosed in the co-pending U.S. Ser. No. 12/150,926 entitled "Plate like member For A Compressible Elastomeric Spring", has a first substantially flat surface 192 thereof abuttingly engaging an axial end 114, 116 of one pad 110 and an opposed second substantially flat surface 194 thereof abuttingly engaging an axial end 114, 116 of an adjacent pad 110. The pads 110 and separator plate like members 190 form in combination a multi-tiered stack having a predetermined initial height, and whereby each pad 110 compresses along the central axis 112 during absorption and dissipation of energy from a dynamic impact load applied thereto causing reduction in the predetermined initial height of the stack and movement of the separator plate like members 190 along the central axis when the dynamic impact load is applied to the spring 102.

The separator plate like member 190 is constructed substantially identical to the plate like member 150 described above, except that the plate like member 190 has a predetermined plurality of first projections, labeled as 160a, at least one of formed integrally with the plate like member 190 and secured to the first surface 192 thereof. Such plurality of first projections 160a extends outwardly from the first surface 192. A predetermined plurality of second projections, labeled as 160b, at least one of formed integrally with the plate like member 190 and secured to the second surface 194 thereof. Such plurality of second projections 160b extends outwardly from the second surface 194 and are disposed in an alternating manner with the plurality of first projections 160a.

The plate like member 190 further has a predetermined plurality of first prongs, labeled as 170a, at least one of formed integrally with the plate like member 190 and secured thereto and extending outwardly at a predetermined angle relative to such first surface 192 thereof and a predetermined plurality of second prongs, labeled as 170b, at least one of formed integrally with the plate like member 190 and secured thereto and extending outwardly at a predetermined angle relative to such second surface 194 thereof.

The second prongs 170b interposed in an alternating manner with the first prongs 170a. Thus, when forming the spring 100, the projections 160a, 160b and prongs 170a and 170b penetrate the respective adjacent surfaces 118, 120 of the pads 110 and extend thereinto. The spring 102 having exposed end pads 110 may be installed between two masses or if required in a particular application, the plate like members 150 or 190 can be also positioned at each end of the spring 102.

It has been found during testing that a configuration of the plate like members 190 and pads 110 wherein the prongs 170a, 170b have trapezoidal shape, are located on or in close proximity to the peripheral edge of the axial aperture 180, generally perpendicular relative to the respective surfaces of the plate like member 190 and are further located in an alternating fashion with each other and wherein the pads 110 are provided with projections 130 and grooves 140, advantageously emulates the conventional center rod concept, without being disadvantaged by the added cost and weight of such center rod. It will be appreciated, that the construction of pads 110 and plates 150, 190 of the present invention provides means for transferring the axial center of the pad 110 from one pad to another, thus creating a substantially axially straight and laterally stable elastomer column or stack of a predetermined height. The quantity of prongs 170a, 170b are generally determined, based on the absorption capability of the spring 100, to provide for such axially straight and laterally stable condition.

It has been found during testing that such configuration enables the spring 102 to achieve its optimum lateral stability and further enables the spring 102 to repetitively absorb and dissipate applied dynamic loads without the need for peripheral guiding.

The lateral stability or stiffness is further enhanced by radially aligning the pluralities of projections 160a, 160b at a predetermined angle to the respective pluralities of prongs 170a, 170b.

Figure 6:
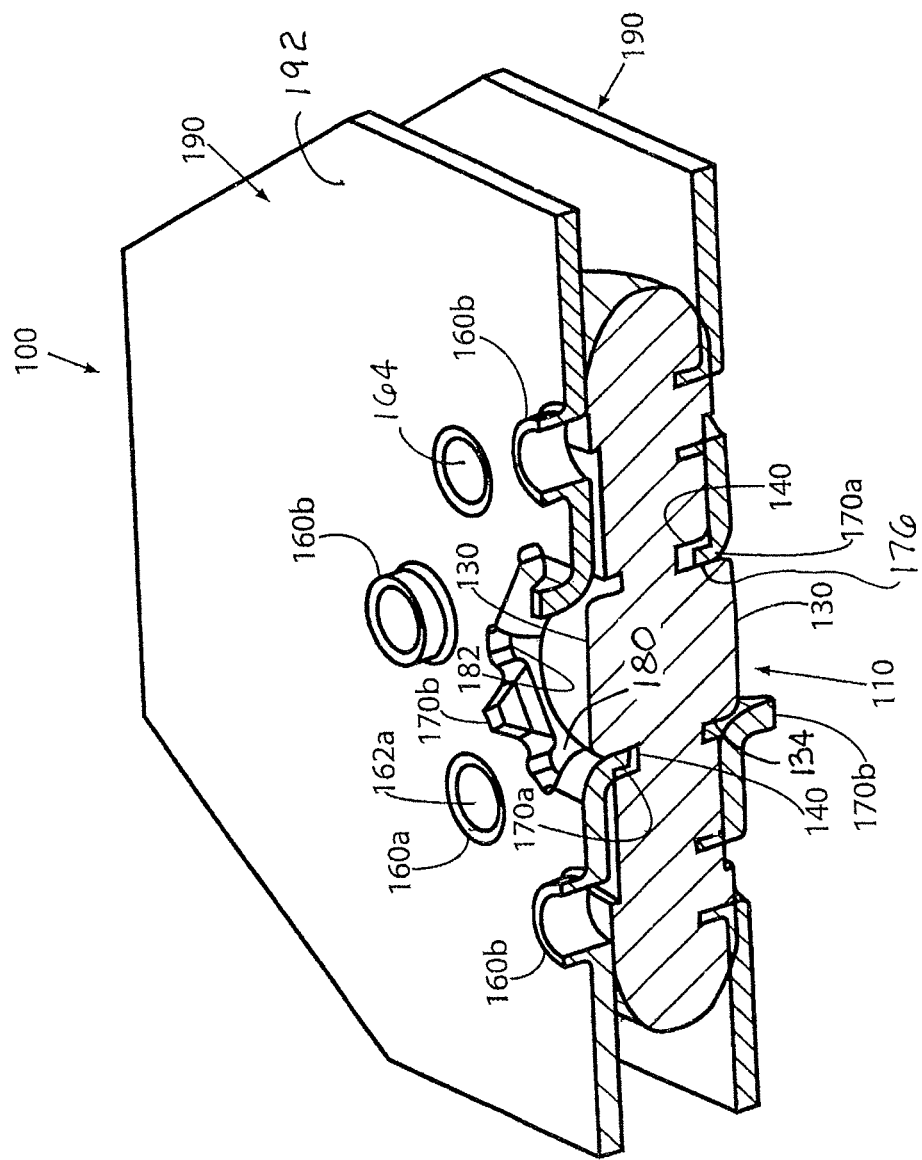
FIG. 6 is an isometric cross-sectional view of a compressible elastomeric spring constructed in accordance with yet another embodiment of the present invention.

Now in reference to FIG. 6, there is illustrated yet another embodiment of the present invention wherein the compressible elastomeric spring is constructed generally identical to the compressible elastomeric spring 100 of FIGS. 1-2, except that the plate like members 150 are replaced by a pair of plate like members 190. The outwardly extending prongs 170b and projections 160b may be advantageous in attaching the spring of FIG. 6 to a pair of masses (not shown). Equally as well, the pair of plate like members 190 may be employed at the ends of the compressible elastomeric spring 102 of FIGS. 3-5.

The advantage of such spring construction will be evident from its use in the draft gears disclosed in the co-pending applications U.S. Ser. No. 12/150,777 entitled "Combination Yoke and Elastomeric Draft Gear", U.S. Ser. No. 12/150,808 entitled "Combination Yoke and Elastomeric Draft Gear Having A Friction Mechanism", U.S. Ser. No. 12/150,927 entitled "Elastomeric Draft Gear Having A Housing, filed concurrently herewith.

The trapezoidal shape of the prong 170 (170a, 170b) and its perpendicular orientation relative to the surface of the plate like member 150, 190 may be also employed in providing means for controlling over-compression of the pads 110. To achieve this, the height of the prong 170 (170a, 170b) is made generally equal to or slightly greater than the maximum operating compressible height of the pad 110. Thus, when the pad 110, is compressed to such maximum operating compressible height the straight end 172 abuttingly engages the surface of the plate like member 150 preventing further axial movement thereof.

The present invention also contemplates that the projections 160 (160a, 160b) may be sized for controlling over-compression of the pads 110. Furthermore, the projections 160 (160a, 160b and prongs 170 (170a, 170b) may be located and sized so that axially opposed projections and/or prongs contact each other for controlling over-compression of the pads 110.

It also within the scope of the present invention to secure at least one stop to at least one edge of the plate like member 150, 190 in a manner as shown in FIGS. 12-13 of U.S. Pat. No. 7,258,243 issued to Sommerfeld and owned by the assignee of the present invention. Teaching of U.S. Pat. No. 7,258,243 are incorporated herein by reference thereto.

Although the present invention has been shown in terms of attaching the plate like members 150, 190 to the pad 110, wherein the prongs 170, 170a, 170b pierce the end surface of the pad 110, the side surface of the projection 130 or the groove 140, it will be apparent to those skilled in the art, that the present invention may be applied to other methods of attaching the plate like members 150, 190 to the pad 110. By way of an example only, the groove 140 may be sized to simply receive the prongs 170 in a slip-fit manner. This arrangement eliminates the need to apply axial forming pressure to one end of the spring and may further enable assembly of the spring at a point of use. Such arrangement may be also suitable where the peripheral guidance is available and where the plate like members 150, 190 are sized accordingly to provide such peripheral guidance during operation of the springs 100, 102.

By way of another example, a plurality of cavities or bores may be simply formed in the pad 110 in alignment with the prongs 170 and receive the prongs 170 in a slip-fit manner causing the above described effects.

Further, in use of the springs 100, 102 within the draft gear of a railcar, the thickness of the plate like members 150 may be selected to be between about 1.00 inch to about 2.00 inches, which represents the thickness of rear and front (coupler) followers or blocks employed within such draft gears. In this application, the projections 160 and the prongs 170 may be welded to one surface of a respective follower either directly or through the use of an intermediate member. For example, the prongs may be formed on an edge of a ring which is then welded to the surface of the rear of front follower. The followers are then located at a respective end of the spring and are formed as part thereof in the above described manner.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A compressible spring for at least absorbing and dissipating energy from a dynamic impact load applied to said compressible spring, said compressible spring comprising:

(a) a compressible elastomeric pad defining a central axis and having a pair of axial ends, said compressible elastomeric pad further having a pair of projections integrally formed therewith;

(b) a pair of end members, each of said pair of end members having a surface thereof abuttingly engaging one of said pair of axial ends and an axial aperture formed through said each of said pair of end members concentric with said central axis;

(c) a predetermined plurality of prongs formed integrally with each of said pair of end members, secured to said surface thereof, or a combination thereof, each of said predetermined plurality of prongs disposed on or offset from an outmost peripheral edge of said axial aperture and extending outwardly at a predetermined angle relative to said surface, wherein said material of said compressible elastomeric pad contacts opposing surfaces of said each of said predetermined plurality of prongs and wherein each of said pair of projections extends into a respective axial aperture and has a peripheral surface thereof sized for frictional engagement with an inner surface of said predetermined plurality of prongs.

2. The compressible spring, according to claim 1, wherein said predetermined plurality of prongs are located at equal angles from each other and at a constant distance from said central axis.

3. The compressible spring, according to claim 1, wherein said frictional engagement is a predetermined interference fit.

4. A compressible spring comprising:
(a) a compressible elastomeric pad defining a central axis and having a pair of axial ends
(b) an end member having a surface thereof abuttingly engaging one of said pair of axial ends;
(c) a plurality of prongs extending outwardly from said surface of said end member and being disposed in a predetermined pattern relative to said central axis; and
(d) an annular axial groove disposed in said one of said pair of axial ends prior to assembly of said elastomeric spring, wherein each of said plurality of prongs is received within said annular groove during assembly of said compressible spring.

5. The compressible spring, according to claim 4, wherein each of said plurality of prongs has a trapezoidal shape and extends outwardly at a predetermined angle relative to said surface.

6. The compressible spring, according to claim 4, wherein each of said plurality of prongs extends generally perpendicular to said surface.

7. The compressible spring, according to claim 4, wherein said end member includes an axial aperture formed therethrough concentric with said central axis and wherein said plurality of prongs disposed on or in close proximity to a peripheral edge of said axial aperture.

8. A compressible spring for at least absorbing and dissipating energy from a dynamic impact load applied to said compressible spring along a central axis thereof, said compressible spring comprising:
(a) a predetermined plurality of elastomeric pads disposed coaxially and in series with each other, each of said predetermined plurality of pads having a peripheral side surface and a pair of axial ends, each of said pair of axial ends has a surface thereof disposed normal to said central axis;
(b) a predetermined plurality of separator plate shaped members, each of said predetermined plurality of separator plate shaped members disposed between a pair of said pads, said each separator plate shaped member having a first substantially flat surface thereof abuttingly engaging an axial end of one of said pair of pads and an opposed second substantially flat surface thereof abuttingly engaging an axial end of an opposed one of said pair of pads, said each separator plate shaped member further having an axial aperture formed through a thickness thereof concentric with said central axis, whereby said pads and separator plate shaped members form in combination a multi-tiered stack having a predetermined initial height, and whereby each pad compresses and extends along said central axis causing movement of said separator plate shaped members along said central axis when such dynamic impact load is applied to and removed from said spring;
(c) a predetermined plurality of first prongs formed integrally with said each separator plate shaped members, secured to said first substantially flat surface thereof, or a combination thereof, each of said predetermined plurality of first prongs having a trapezoidal shape, being disposed on or offset from an outmost peripheral edge of said axial aperture and extending outwardly at a predetermined angle relative to said first substantially flat surface into a material of a respective elastomeric pad such that said material of said pad contacts opposing surfaces of said each of said predetermined plurality of first prongs;
(d) a predetermined plurality of second prongs formed integrally with said each separator plate shaped member, secured to said first substantially flat surface thereof, or a combination thereof, each of said predetermined plurality of second prongs having a trapezoidal shape, being disposed on or offset from said outmost peripheral edge of said axial aperture and extending outwardly at a predetermined angle relative to said second substantially flat surface into a material of a respective elastomeric pad such that said material of said pad contacts opposing surfaces of said each of said predetermined plurality of second prongs;
(e) wherein an inner surface of each of said first and second pluralities of prongs is disposed tangential to an outmost peripheral edge of a respective axial aperture when said each prong is disposed on said outmost peripheral edge thereof or disposed in a plane being parallel to a plane disposed tangential to said outmost peripheral edge of said respective axial aperture when said each prong is offset from an outmost peripheral edge of said respective axial aperture; and
(f) a first groove formed within said surface of one of said pair of axial ends and a second groove formed within said surface of another one said pair of axial ends, wherein each of said predetermined plurality of first prongs is received within said first groove and wherein each of said predetermined plurality of said second prongs is received within said second groove.

9. The compressible spring of claim 8, further including means for controlling over-compression of said each of said predetermined plurality of pads.

10. The compressible spring of claim 8, wherein a height of said each of said predetermined plurality of first and second prongs has a height thereof being about equal to or greater than a maximum operating compressible height of said each of said predetermined plurality of pads.

11. The compressible spring according to claim 8, wherein said each elastomeric pad includes a pair of axial projections integrally formed therewith.

12. A compressible spring for at least absorbing and dissipating energy from a dynamic impact load applied to said compressible spring along a central axis thereof, said compressible spring comprising:
(a) a predetermined plurality of elastomeric pads disposed coaxially and in series with each other, each of said predetermined plurality of pads having a peripheral side surface and a pair of axial ends, each of said pair of axial ends has a surface thereof disposed normal to said central axis;
(b) a predetermined plurality of separator plate shaped members, each of said predetermined plurality of separator plate shaped members disposed between a pair of said pads, said each separator plate shaped member having a first substantially flat surface thereof abuttingly engaging an axial end of one of said pair of pads and an opposed second substantially flat surface thereof abuttingly engaging an axial end of an opposed one of said pair of pads, whereby said pads and separator plate shaped members form in combination a multi-tiered stack having a predetermined initial height, and whereby said each pad compresses and extends along said central axis causing movement of said separator plate shaped members along said central axis when such dynamic impact load is applied to and removed from said spring;

(c) an axial aperture formed through said each of said predetermined plurality of separator plate shaped members concentric with said central axis of said stack;

(d) a predetermined plurality of first prongs formed integrally with said each separator plate shaped member, secured to said first substantially flat surface thereof, or a combination thereof, said each of said predetermined plurality of first prongs extending outwardly at a first predetermined angle relative to said first substantially flat surface;

(e) a predetermined plurality of second prongs formed integrally with said each separator plate shaped member, secured to said first substantially flat surface thereof, or a combination thereof, said each of said predetermined plurality of second prongs extending outwardly at a second predetermined angle relative to said second substantially flat surface;

(f) each of said predetermined plurality of first and second prongs defines a trapezoidal shape including a pair of side edges tapering outwardly toward said peripheral edge;

(g) a gap defined between proximal ends of a pair of opposite side edges of a pair of adjacent first and second prongs; and (h) a first groove formed within said surface of one of said pair of axial ends and a second groove formed within said surface of another one said pair of axial ends, wherein each of said predetermined plurality of first prongs is received within said first groove and wherein each of said predetermined plurality of said second prongs is received within said second groove.

13. The compressible spring, according to claim 12, wherein said compressible spring further includes a pair of projections formed integrally with a respective axial end of said each pad, and wherein each of said pair of projections extends into a respective axial aperture of an abuttingly positioned separator plate shaped member and is sized for frictional engagement with a respective predetermined plurality of prongs.

14. The compressible spring, according to claim 13, wherein said compressible spring further includes:

(a) a predetermined plurality of first projections integrally formed with said each of said predetermined plurality of separator plates, secured to said first substantially flat surface thereof, or combination thereof, each of said predetermined plurality of first projections extending outwardly from said first substantially flat surface of said each separator plate shaped member and a plurality of first apertures each formed through a respective first projection and through said separator plate shaped member; and (b) a predetermined plurality of second projections at least one of integrally formed with said each of said predetermined plurality of separator plates, secured to said first substantially flat surface thereof, or combination thereof, each of said predetermined plurality of second projections extending outwardly from said second substantially flat surface of said each separator plate shaped member and a plurality of second apertures each formed through a respective second projection and through said each separator plate shaped member.

15. The compressible spring, according to claim 14, wherein said predetermined plurality of second projections are interposed in an alternating manner with said predetermined plurality of first projections.

16. The compressible spring, according to claim 12, wherein said compressible spring unit includes means for aligning said plurality of separator plate shaped members within said stack.

17. The compressible spring, according to claim 16, wherein said alignment means includes an alignment aperture formed through said each of said predetermined plurality of separator plate shaped members.

18. The compressible spring, according to claim 12, wherein said spring includes a pair of outer plate shaped members each of said pair of outer plate shaped members having one surface thereof abuttingly engaging an outer surface of a respective end pad and means for attaching said each of said pair of outer plate shaped members with said respective end pad.

19. The compressible spring, according to claim 12, wherein said first and second grooves are present in said each elastomeric pad prior to forming said multi-tiered stack.

20. A compressible spring for at least absorbing and dissipating energy from a dynamic impact load applied to said compressible spring along a central axis thereof, said compressible spring comprising:

(a) a plurality of elastomeric pads disposed coaxially and in series with each other, each of said plurality of pads having a peripheral side surface and a pair of axial ends, each of said pair of axial ends has a surface thereof disposed normal to said central axis;

(b) a plurality of plate shaped members, each of said predetermined plurality of plate shaped members disposed between a pair of said pads, said each plate shaped member having a first substantially flat surface thereof abuttingly engaging an axial end of one of said pair of pads and an opposed second substantially flat surface thereof abuttingly engaging an axial end of an opposed one of said pair of pads, whereby said pads and plate shaped members form in combination a multi-tiered stack having a predetermined initial height, and whereby said each pad compresses and extends along said central axis causing movement of said plate shaped members along said central axis when such dynamic impact load is applied to and removed from said spring;

(c) an axial aperture formed through said each of said plurality of plate shaped members concentric with said central axis of said stack; and (d) a plurality of first prongs formed integrally with said each plate shaped member, secured to said first substantially flat surface thereof, or a combination thereof, each of said plurality of first prongs extending outwardly at a first angle relative to said first substantially flat surface;

(e) a plurality of second prongs formed integrally with said each plate shaped member, secured to said first substantially flat surface thereof, or a combination thereof, each of said plurality of second prongs extending outwardly at a second angle relative to said second substantially flat surface;

(f) each of said plurality of first and second prongs defines a trapezoidal shape including a pair of side edges tapering outwardly toward said peripheral edge; and
(g) a first groove formed within said surface of one of said pair of axial ends and a second groove formed within said surface of another one said pair of axial ends, wherein each of said predetermined plurality of first prongs is received within said first groove and wherein each of said predetermined plurality of said second prongs is received within said second groove.

\* \* \* \* \*